United States Patent
Griffith

(10) Patent No.: US 6,195,541 B1
(45) Date of Patent: Feb. 27, 2001

(54) INTERACTION OF A WIRELESS TELEPHONE WITH A TRANSACTION UNIT

(75) Inventor: Gary L. Griffith, Arvada, CO (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/127,394

(22) Filed: Jul. 31, 1998

(51) Int. Cl.⁷ .................................................. H04M 15/00
(52) U.S. Cl. ......................... 455/406; 379/93.12; 705/26
(58) Field of Search .................................. 455/426, 406, 455/414, 413; 705/26, 27; 379/93.12

(56) References Cited

U.S. PATENT DOCUMENTS

| | | | | |
|---|---|---|---|---|
| 5,608,778 | * | 3/1997 | Partidge ................................. | 379/58 |
| 5,719,918 | * | 2/1998 | Serbetciouglu ........................ | 379/58 |
| 5,903,830 | * | 5/1999 | Joao ..................................... | 455/406 |
| 5,907,801 | * | 5/1999 | Albert .................................. | 455/406 |
| 5,983,093 | * | 11/1999 | Haimi-Cohen ....................... | 455/411 |
| 5,983,094 | * | 11/1999 | Atschul ............................... | 455/413 |

\* cited by examiner

*Primary Examiner*—Daniel S. Hunter
*Assistant Examiner*—Nick Corsaro
(74) *Attorney, Agent, or Firm*—John C. Moran

(57) ABSTRACT

Utilizing a wireless telephone to function as a transaction device. In a first embodiment, the wireless telephone places a call to the transaction unit directly. For example, the transaction unit may be a cash register at a supermarket. The wireless telephone then transfers to the transaction unit account information specifying the type of account against which the transaction is to be billed and identification of that transaction. The transaction unit responds with a transaction number that is transmitted to the wireless telephone. The user of the wireless telephone then confirms the transaction when the correct transaction number is displayed on the transaction unit. After the transaction is completed, the transaction unit transmits the data defining the transaction to the wireless telephone which stores this information in a database associated with the account against which the transaction was charged. In a second embodiment, the transaction number is not visually displayed but rather is transmitted over a second transmission media by the transaction unit to the wireless telephone confirming that the correct transaction is taking place.

11 Claims, 10 Drawing Sheets

INTERACTION OF A WIRELESS TELEPHONE WITH A TRANSACTION UNIT

CROSS REFERENCE TO RELATED APPLICATIONS

G. L. Griffith, "A Wireless Telephone As A Transaction Device"; and

G. L. Griffith, "Identification By A Central Computer Of A Wireless Telephone Functioning As A Transaction Device".

These applications are being filed concurrently with this application and are assigned to the same assignee.

TECHNICAL FIELD

This invention relates to cordless, cellular, and PCS telephone systems and more particularly, to an arrangement for transferring user data via a wireless telephone to a transaction unit.

BACKGROUND OF THE INVENTION

Within the prior art, various transaction devices have been utilized to allow individuals to perform transactions. These transactions may be to purchase merchandise or services or maybe to gain access to a secure area. Among the commonly used transaction devices is a credit card with a magnetic strip that identifies the credit card account of the individual. The standard credit card has no capability of receiving information from the transaction unit utilized to read the credit card. However, various types of smart cards do have the ability to store transactional information and to later reproduce this transaction information. For example, it is possible to have a smart card that is utilized as a standard credit card but receives information from the transactional unit defining what was purchased. In addition, the smart card can organize this information for later transmission to a personal computer via a physical link.

Similarly, other types of transactions involve such things as entering secure areas. Because of the need to preserve proprietary information, or restrict access to dangerous physical locations, many building facilities have secure areas which can only be accessed by designated people. Access to these secure areas is controlled by identification of personal features of an individual, keyed or unkeyed locks, and identification badges such as cards with magnetic strips. The cards with magnetic strips are similar to credit cards or smart cards.

The problems that exists with the prior art transaction devices fall into three major categories. First, these devices require that the transaction unit have a special interface for reading information from the device. The special reading facility may take the form of physical contact such as in a credit card application or may allow limited wireless reading of the transaction device by the transaction unit using, for example, electromagnetic transmission. However, even in the situation where the transaction device communicates information via electromagnetic transmission, the transaction unit must be specifically equipped for the particular type of electromagnetic transmission. The second problem is the proliferation of credit cards, check books, debit cards, and security cards that the average individual must carry. Third, is the amount of time required to complete the transaction. For example, when a credit card is used to purchase groceries at a supermarket. First, the groceries must be rung up; and then, the credit card entered and verified before the transaction can be completed.

SUMMARY OF THE INVENTION

The foregoing problems are solved and a technical advance is achieved by the utilization of a wireless telephone to function as a transaction device. In a first embodiment, the wireless telephone places a call to the transaction unit directly. For example, the transaction unit may be a cash register at a supermarket. The wireless telephone then transfers to the transaction unit account information specifying the type of account against which the transaction is to be billed and identification of that transaction. The transaction unit responds with a transaction number. The user of the wireless telephone then confirms the transaction when the correct transaction number is displayed on the transaction unit. After the transaction is completed, the transaction unit transmits the data defining the transaction to the wireless telephone which stores this information in a database associated with the account against which the transaction was charged. Advantageously, before placing the call to the transaction unit, the wireless telephone requests personal identification information from the user to assure that the user is authorized to make the transaction.

In a second embodiment, the transaction number is not visually displayed but rather is transmitted over a second transmission media by the transaction unit to the wireless telephone confirming that the correct transaction is taking place.

Advantageously, by utilizing the transaction number, the wireless telephone can transmit the account information to the transaction unit well in advance of the actual financial transaction taking place. For example, within a supermarket, the user could request that the wireless telephone transmit the account information while the user was is standing in line for the cash register. In such a situation, the user would have to specify the cash register to the wireless telephone.

Advantageously, the wireless telephone can place a call to a personal computer of the user and transfer the account information to the personal computer. This alleviates the need of the user physically attaching the wireless telephone to the personal computer. It is assumed that the personal computer performs the necessary financial and database functions on account information as required by the user. Also, the wireless telephone can request that the transaction unit transfer the account data to the personal computer via a communication link.

These and other features and advantages of the invention will become apparent from the following description of illustrative embodiments of the invention considered together with the drawing.

DETAILED DESCRIPTION

Figure 1:
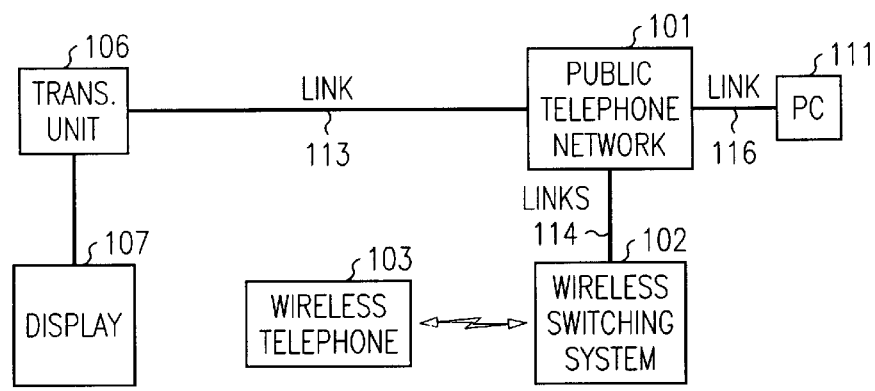
FIG. 1 is a block diagram of a system for performing the first embodiment.

FIG. 1 illustrates a system for implementing the first embodiment of the invention. In the first embodiment of the invention, transaction unit 106 is illustrated with attached display 107. If transaction unit 106 is used in a supermarket, then, transaction unit 106 would be a cash register also referred to as a point of sale (POS) terminal. Wireless telephone 103 interconnects via a wireless communication path to wireless switching system 102 that is connected via links 114 to public telephone network 101. The user of wireless telephone 103 has personal computer (PC) 111 at the user's residence. PC 111 is interconnected via a modem and link 116 to public telephone network 101. Transaction unit 106 is interconnected via a modems and link 113 to public telephone network 101.

To understand the operation of the first embodiment, consider the following example. Transaction unit 106 is in a supermarket; and the user of wireless telephone 103 has selected merchandise and is waiting in line to pay for this merchandise at transaction unit (cash register) 106. The user initiates a call to transaction unit 106 via wireless switching system 102, links 114, public telephone network 111, and links 113. Advantageously, this call may be simply a data call. Before setting up the call, wireless telephone 103 verifies that the user has permission to purchase merchandise by requesting and verifying personal information about the user. The personal information can consist of a personal identification number (PIN) or voice recognition techniques. After the identity of the user has been verified, wireless telephone 103 establishes the call to transaction unit 106. Once the call is connected, wireless telephone 103 transmits to transaction unit 106 the identification number of transaction unit 106 and account information defining the type of account that wireless telephone 103 wishes the merchandise charged against merchandise.

Transaction unit 106 then verifies the account information. If a credit card number is being utilized, transaction unit 106 will contact a credit card database to verify that the number is valid. These steps can be performed while the user is in line since no direct interaction is required with a person operating transaction unit 106. Transaction unit 106 transmits to wireless telephone 103 a transaction number that is used to verify the transaction. Wireless telephone 103 displays the transaction number. Transaction unit 106 also displays the transaction number on display 107. If the displayed transaction number is identical to the transaction number received by wireless telephone 103, the user accepts the transaction. Wireless telephone 103 then transmits acceptance to transaction unit 106.

Transaction unit 106 then transmits to wireless telephone 103 transaction data that is stored internally by wireless telephone 103 for later use. Advantageously, the transaction data consists of an itemized list of items by price. Wireless telephone 103 is responsive to the transaction data to either store it internally or to transmit it via wireless switching system 102, links 114, public telephone network 101, and link 116 to PC 111. Advantageously, this transfer can occur at a later point in time. U.S. Pat. No. 5,559,313 discloses how such transaction data could be utilized and processed by PC 111.

Figure 2:
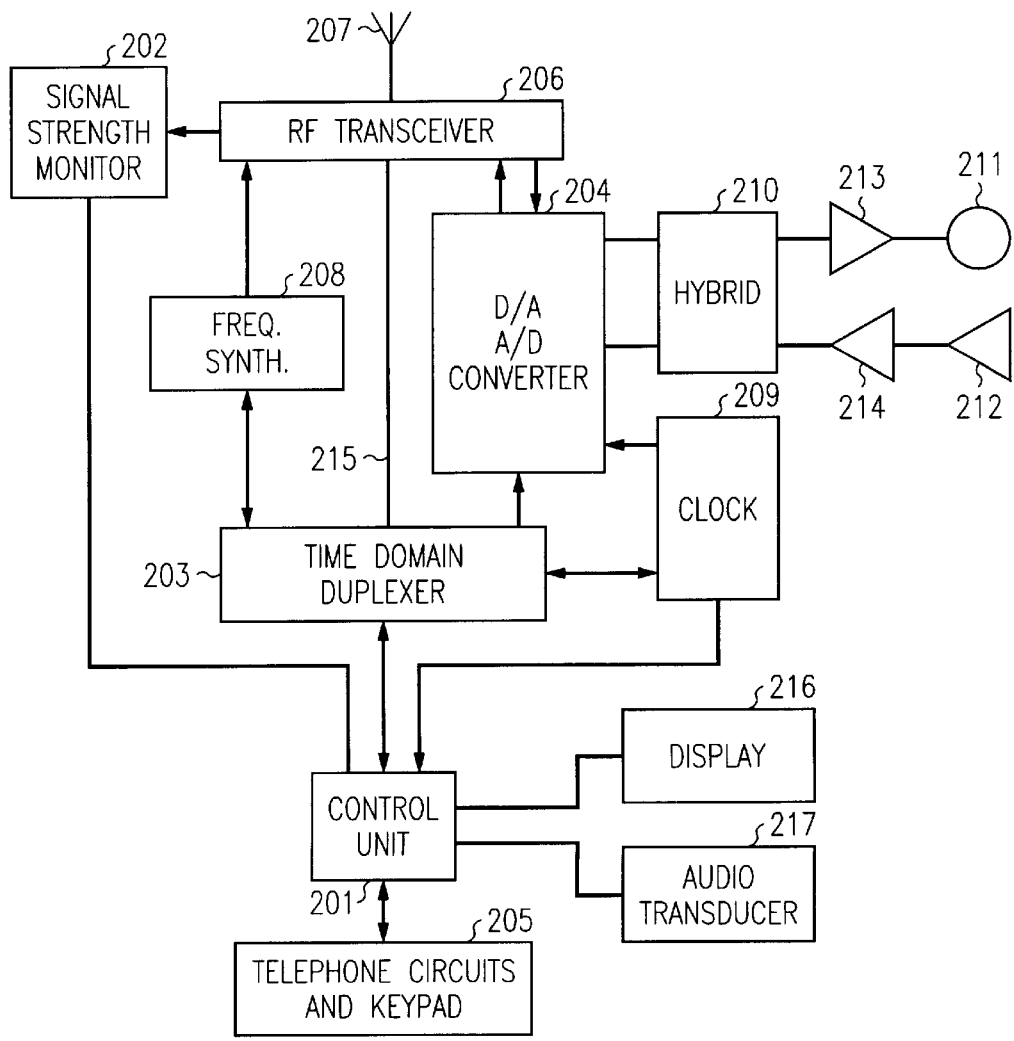
FIG. 2 is a block diagram of a wireless telephone for utilization in the first embodiment.

Wireless telephone 103 is advantageously illustrated in greater detail in FIG. 2. Wireless set 103 implements a wireless protocol that allows wireless telephone 103 to establish a wireless signal link with wireless switching system 102. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless telephone is provided by control unit 201. Units 202, 203, 206, 207, 208, and 209 provide the RF communication capabilities for the wireless telephone. Elements 204, 210, and 211–214 provide the audio information received and transmitted to the user; whereas, elements 216–218 and 205 provide the basic user interface. In response to receiving a transaction number via units 206, 208, and 203, control unit 201 displays the transaction number on display 216.

Figure 3:
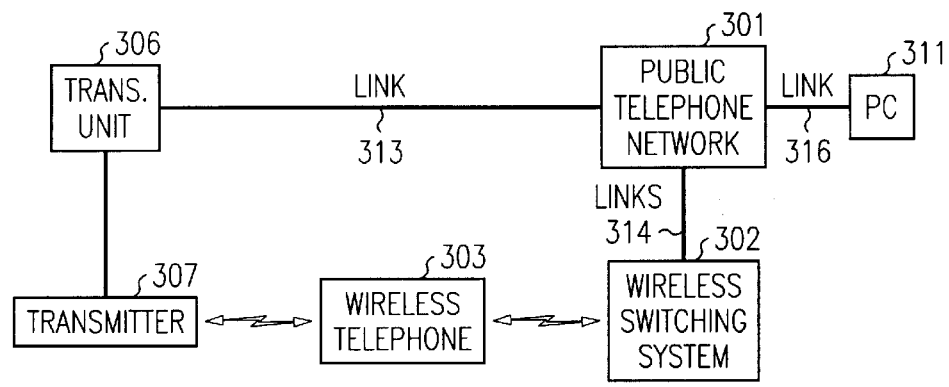
FIG. 3 illustrates in block diagram form, a system including the second embodiment.

FIG. 3 illustrates a system for implementing the second embodiment of the invention. The operation of the second embodiment is similar to that of the first embodiment with the exception that the transaction number is transmitted via a second transmission medium distinct from the transmission medium of wireless switching system 302 to the wireless telephone 303 by transaction unit 306. The transmission of the transaction number via the second medium frees the user from having to do the visual comparison of the transaction number.

Figure 4:
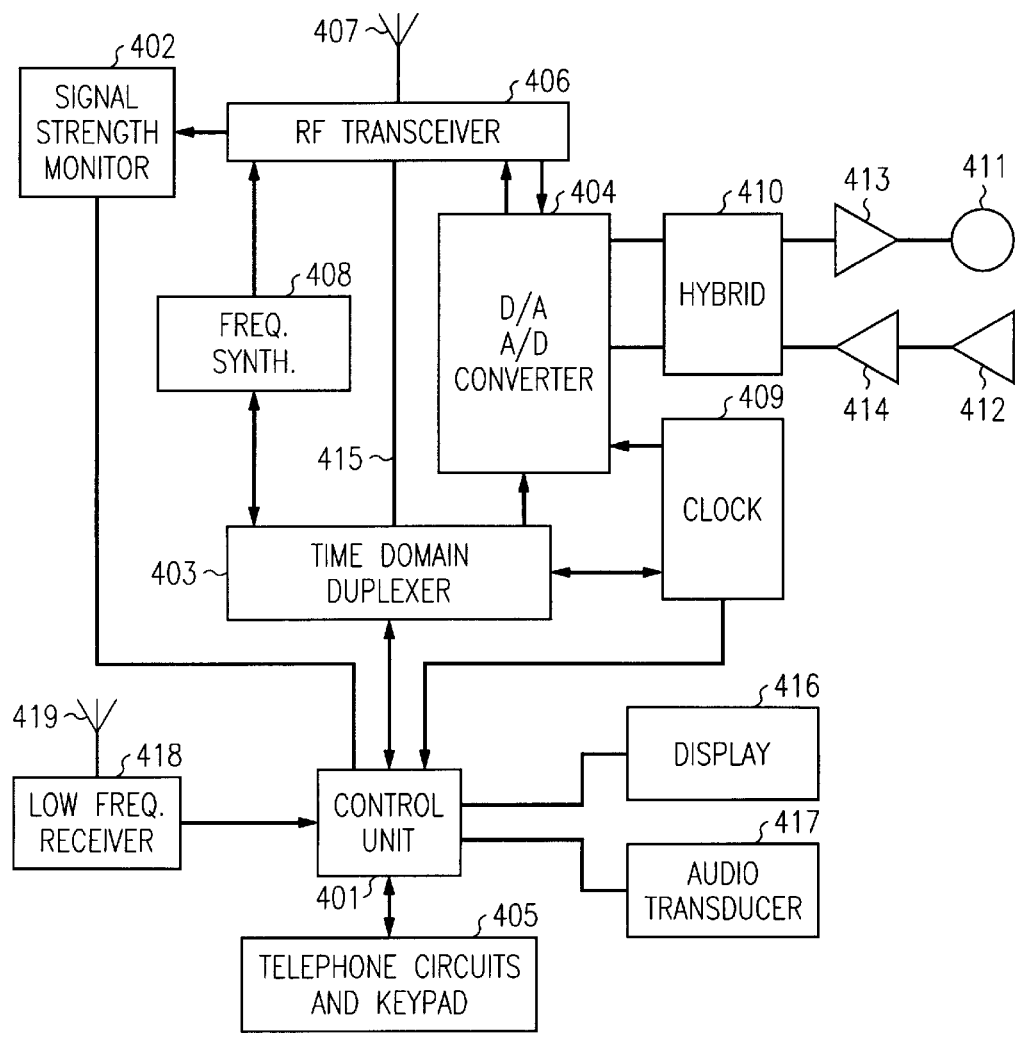
FIG. 4 illustrates, in block diagram form, a wireless telephone for utilization in the second embodiment.

Wireless telephone 303 is advantageously illustrated in greater detail in FIG. 4. Wireless set 303 implements a wireless protocol that allows wireless telephone 303 to establish a wireless signal link with wireless switching system 302. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless telephone is provided by control unit 401. Units 402, 403, 406, 407, 408, and 409 provide the RF communication capabilities for the wireless telephone. Elements 404, 410, and 411–414 provide the audio information received and transmitted to the user; whereas, elements 416–418 and 405 provide the basic user interface.

Figure 5:
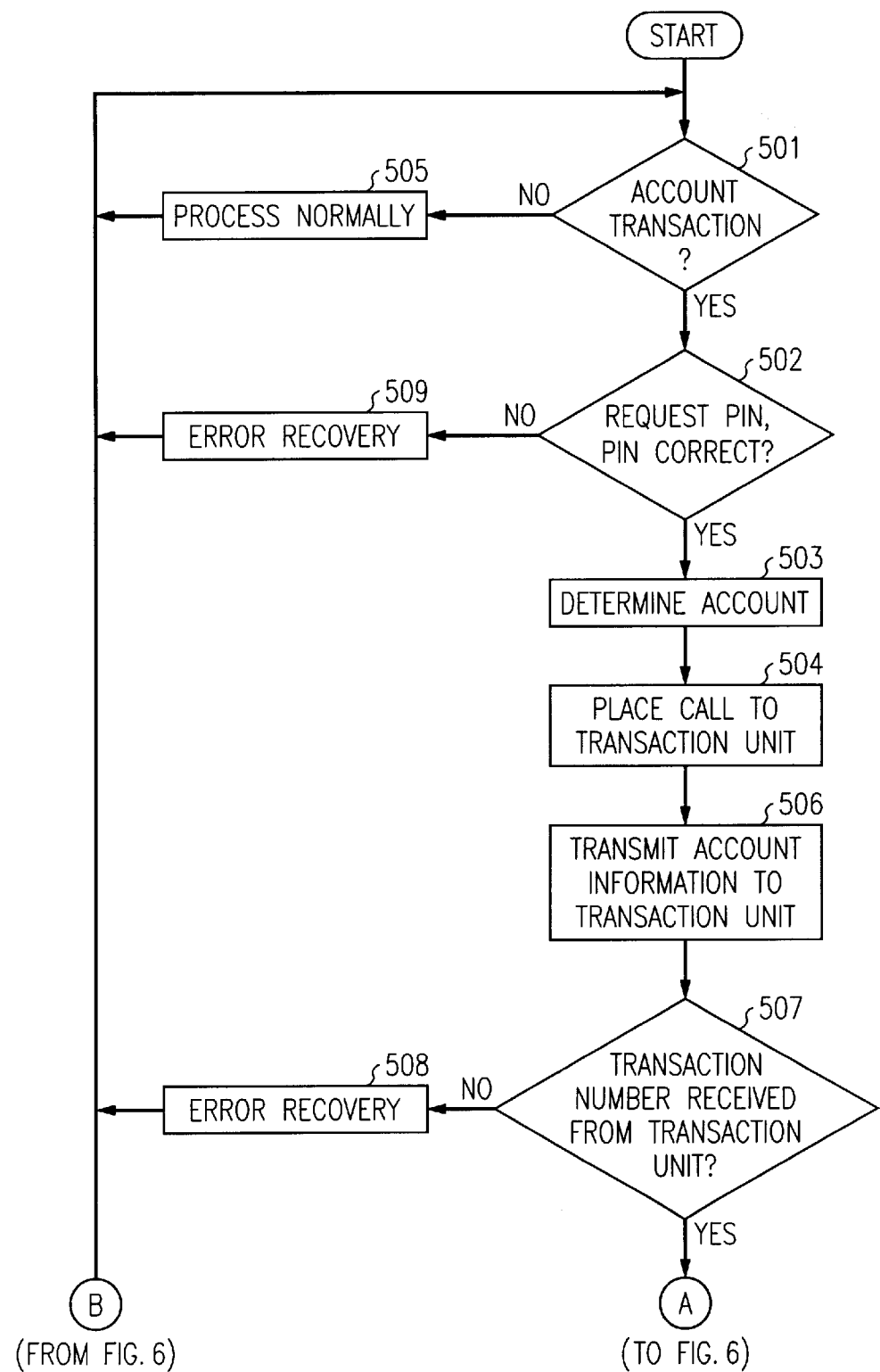
FIGS. 5 and 6, illustrate in flowchart form, steps performed by a wireless telephone in the first embodiment of the invention.
Figure 6:
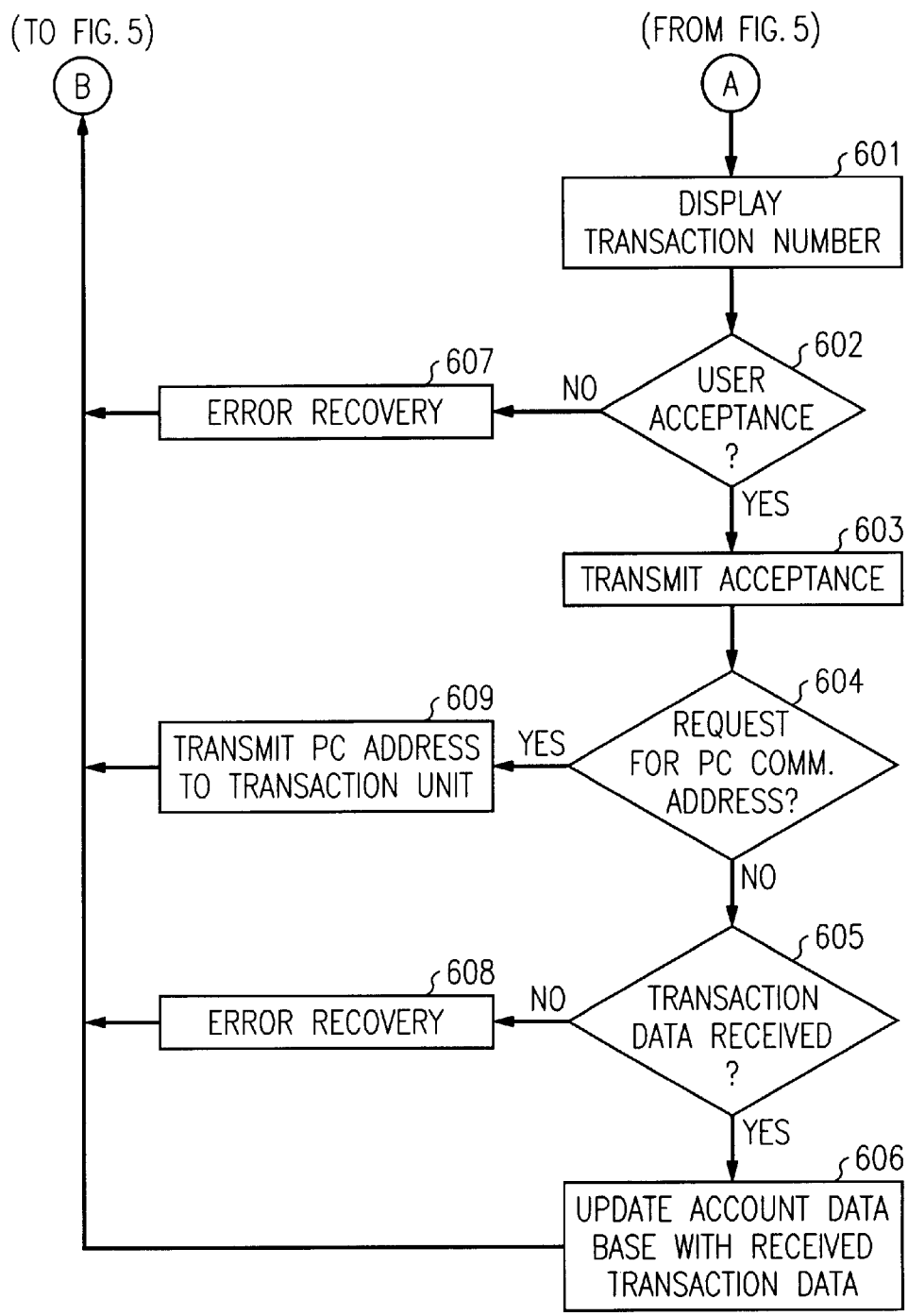

FIGS. 5–8 illustrate, in flowchart form, steps performed in implementing the first embodiment of the invention. FIGS. 5 and 6 illustrate steps performed by wireless telephone 103 of FIGS. 1 and 2. After the operations are started, decision block 501 of FIG. 5 determines if the user is requesting an account transaction. If the answer is no, block 505 performs normal processing before returning control back to decision block 501.

If the answer in decision block 501 is yes, decision block 502 requests the PIN or other personal identification information from the user and verifies that the PIN is correct. If the answer is no, control is transferred to block 509 which performs error recovery before transferring control back to decision block 501. If the answer in decision block 502 is yes, control is transferred to block 503 which determines what type of an account the user wishes to use. Block 504 then places a call to transaction unit 106 and identifies transaction unit 106 by a identification number. After the call has been completed to transaction unit 106, block 506 transmits the account information to transaction unit 106 before transferring control to decision block 507. Decision block 507 waits for the transaction number from transaction unit 106. If the transaction number is not received, control is transferred to block 508 which performs error recovery before transferring control back to decision block 501. If the transaction number is received from transaction unit 106, control is transferred to block 601 of FIG. 6.

Block 601 displays the transaction number utilizing a display such as a display 107 of FIG. 1 before transferring control to decision block 602. The later decision block waits for the user's acceptance. If the user does not accept, control is transferred to block 607 which performs error recovery before transferring control back to decision block 501 of FIG. 5. If the user's acceptance is received, control is transferred to block 603 which transmits the acceptance to transaction unit 106. Decision block 604 then awaits for the transaction data to be received from transaction unit 106. If the transaction data is not received, block 608 performs error recovery before transferring control back to decision block 501 of FIG. 5. If the transaction data is received by decision block 604, control is transferred to block 606 which updates the account database with the received transaction data. As previously noted, this updating of the account database can consist of internally storing the transaction data or transmitting it to the PC of the user by placing a telephone call to the PC.

Figure 7:
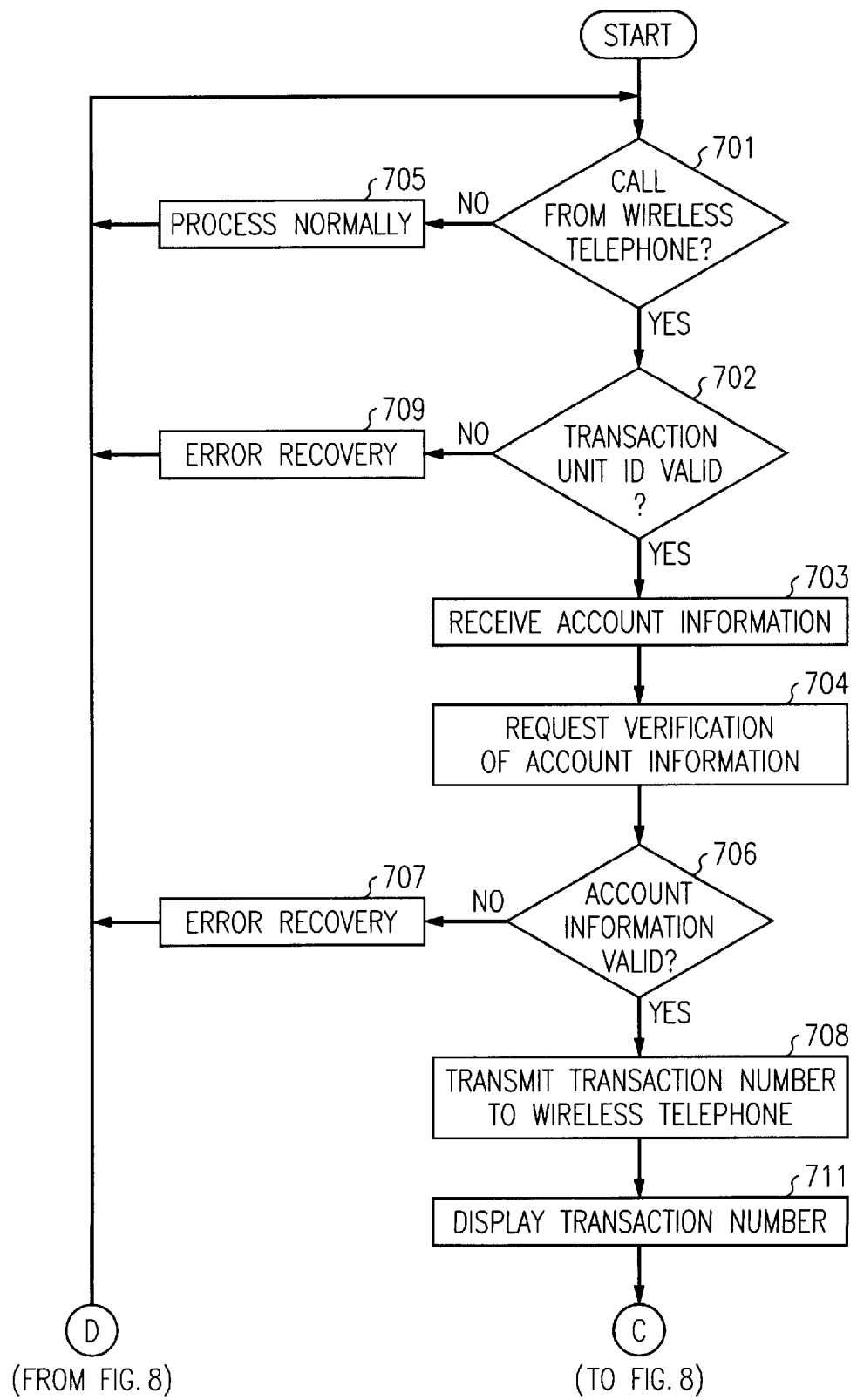
FIGS. 7 and 8 illustrate, in flowchart form, steps performed by a transaction unit in the first embodiment of the invention.
Figure 8:
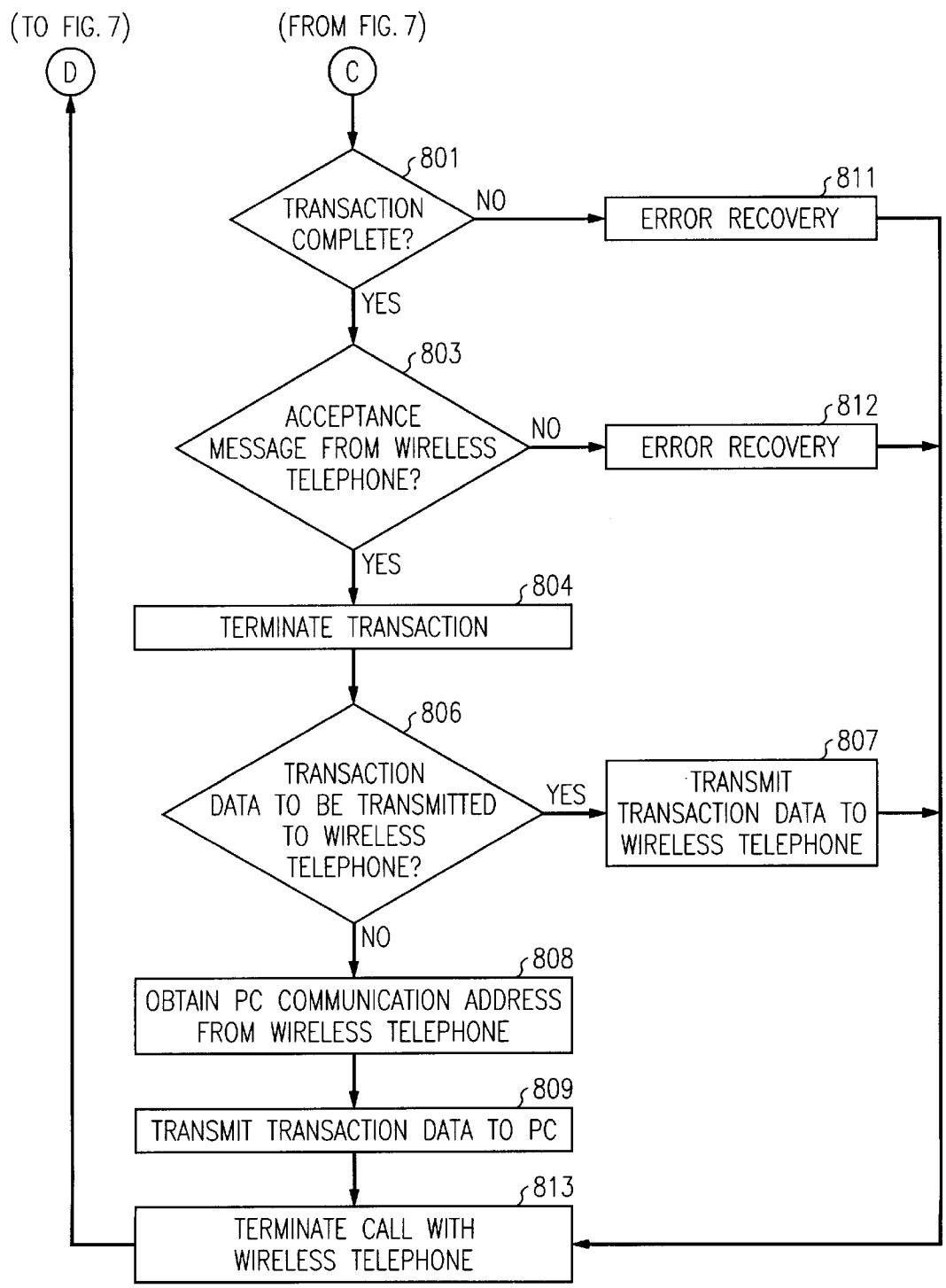

FIGS. 7 and 8 illustrate the steps performed by transaction unit 106 FIG. 1. Once operation has started, decision block 701 determines if a call from a wireless telephone has been received. If the answer is no, block 705 performs normal processing before returning control back to decision block 701. If the answer is yes, decision block 702 determines if transaction unit 106 was correctly identified in the message from the wireless telephone. If the answer is no in decision block 702, block 709 performs error recovery before transferring control back to decision block 701. If the answer is yes in decision block 702, block 703 receives the account information transmitted by the wireless telephone. Block 704 then verifies the account information. For a credit card number, block 704 contacts a credit card database, not illustrated in FIG. 1, to obtain verification of the credit card number. Decision block 706 then determines if the account information verified in block 704 is valid. If the answer is no, block 707 performs error recovery before transferring control back to decision block 701. If the answer in decision block 706 is yes, transaction unit 106 determines a transaction number and transmits that transaction number to the wireless telephone by execution of block 708. Block 711 displays the transaction number using display 307 before transferring control to decision block 801 of FIG. 8.

Decision block 801 determines when the transaction is complete. If the answer is no in decision block 801, block 811 performs error recovery before transferring control to block 813. Block 813 terminates the call with the wireless telephone before transferring control back to decision block 701 of FIG. 7. If the answer is yes in decision block 801, control is transferred to decision block 803 which determines if an acceptance message has been received from the wireless telephone. If no acceptance message has been received, block 812 performs error recovery before transferring control to block 813. If an acceptance message has been received from the wireless telephone, block 804 terminates the transaction on transaction unit 106 so that another transaction can be started.

Then, block 804 transfers control to decision block 806. Decision block 806 determines if the transaction data gathered during the transaction is to be transmitted to the wireless telephone or to a PC owned by the user of the wireless telephone. If the transaction data is to be transmitted directly to the wireless telephone, block 807 performs this operation before transferring control to block 813. If the answer in decision block 806 is no, block 808 obtains the communication address of the PC from the wireless telephone. This communication address may be a telephone number so that a data call may be set up via a modem connected to the PC. The transmission of the transaction data to the PC is performed by block 809. After execution of block 809, control is transferred to block 813.

Figure 9:
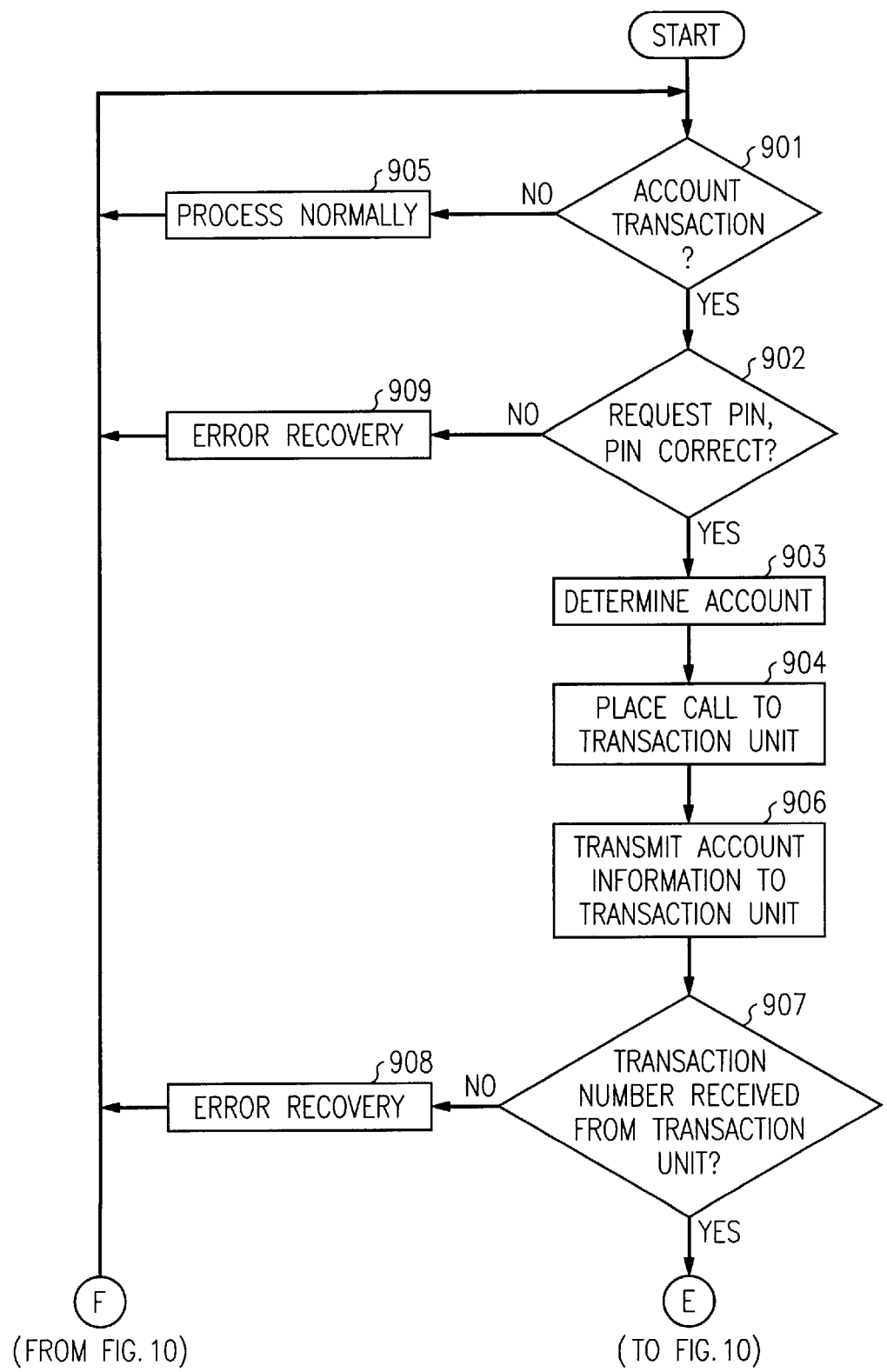
FIGS. 9 and 10 illustrate, in flowchart form, steps performed by a wireless telephone in a second embodiment of the invention.
Figure 10:
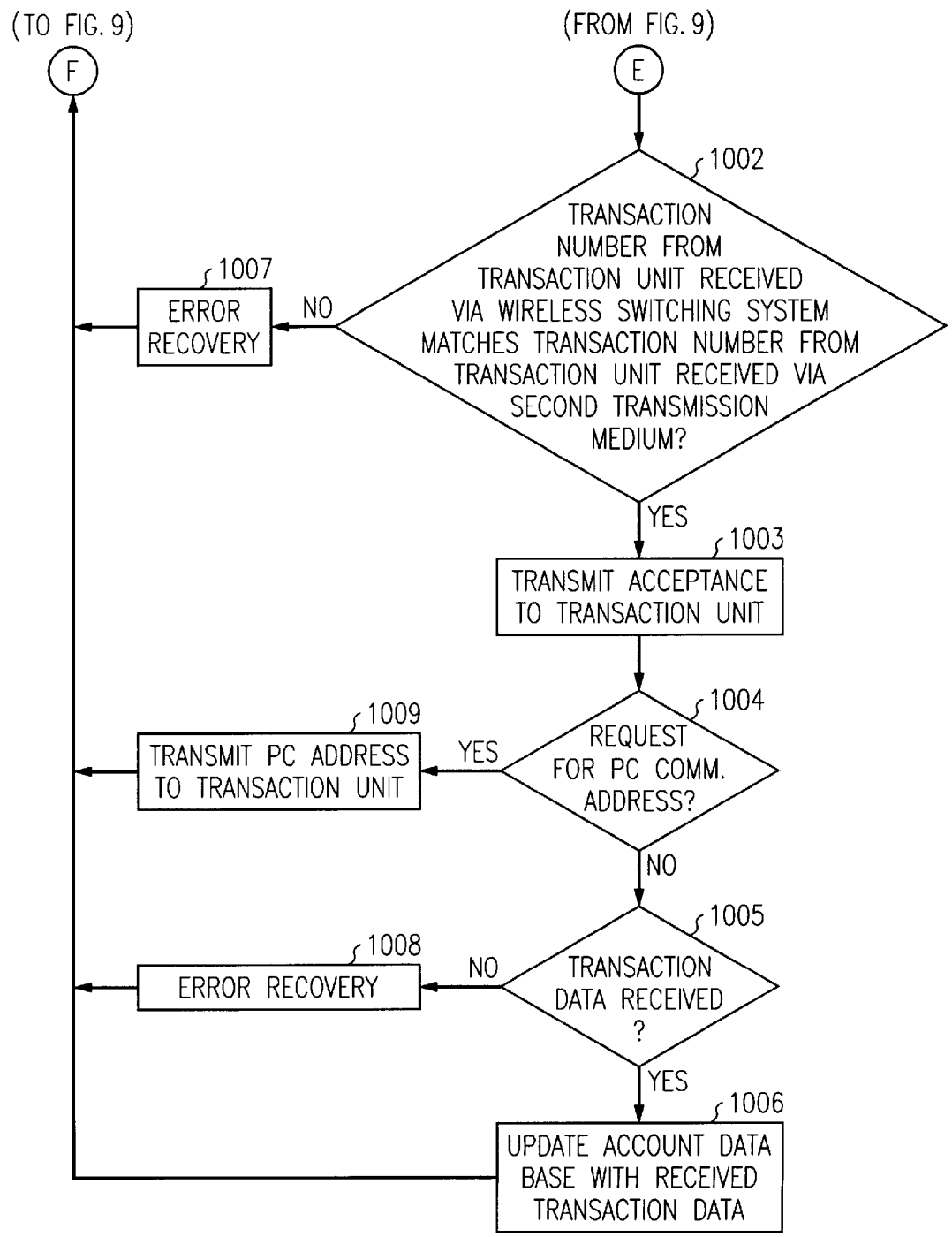

FIGS. 9–12 illustrate the steps performed in implementing the second embodiment of the invention. FIGS. 9 and 10 illustrate steps performed by wireless telephone 303 of FIGS. 3 and 4. After the operations are started, decision block 901 of FIG. 9 determines if the user is requesting an account transaction. If the answer is no, block 905 performs normal processing before returning control to back to decision block 901.

If the answer in decision block 901 is yes, decision block 902 requests the PIN or other personal identification information from the user and verifies that the PIN is correct. If the answer is no, control is transferred to block 909 which performs error recovery before transferring control back to decision block 901. If the answer in decision block 902 is yes, control is transferred to block 903 which determines what type of an account the user wishes to use. Block 904 then places a call to transaction unit 306 and identifies transaction unit 306 with an identification number. After the call has been completed to transaction unit 306, block 906 transmits the account information to transaction unit 306 before transferring control to decision block 907. Decision block 907 waits for a transaction number from transaction unit 306. If the transaction number is not received, control is transferred to block 908 which performs error recovery before transferring control back to decision block 901. If the transaction number is received from transaction unit 306, control is transferred to block 1001 of FIG. 10.

Block 1001 receives the transaction number from transaction unit 306. Decision block 1002 determines if the transaction number from transaction unit 306 matches the transaction number being transmitted from transmitter 307. The comparison in decision block 1002 is performed over a predefined amount of time. If after a predefined amount of time there is not a match, block 1007 performs error recovery before transferring control to decision block 901 of FIG. 9. If the answer is yes in decision block 1002, block 1003 transmits an acceptance message to transaction unit 306. Next, decision block 1004 determines if a request has been received for the communication address of the user. If the answer is yes, block 1009 transmits the PC communication address to transaction unit 306. If the answer is no in decision block 1004, decision block 1005 determines if transaction data has been received from transaction unit 306. If the answer is yes, block 1006 updates the account database with the received transaction data before returning control to decision block 901 of FIG. 9. If the answer is no in decision block 1005, block 1008 performs an error recovery before transferring control to decision block 901 of FIG. 9. Block 1006 updates the account database with the received transaction data. As previously noted, this updating of the account database can consist of internally storing the transaction data or transmitting it to the PC of the user by placing a telephone call to the PC.

Figure 11:
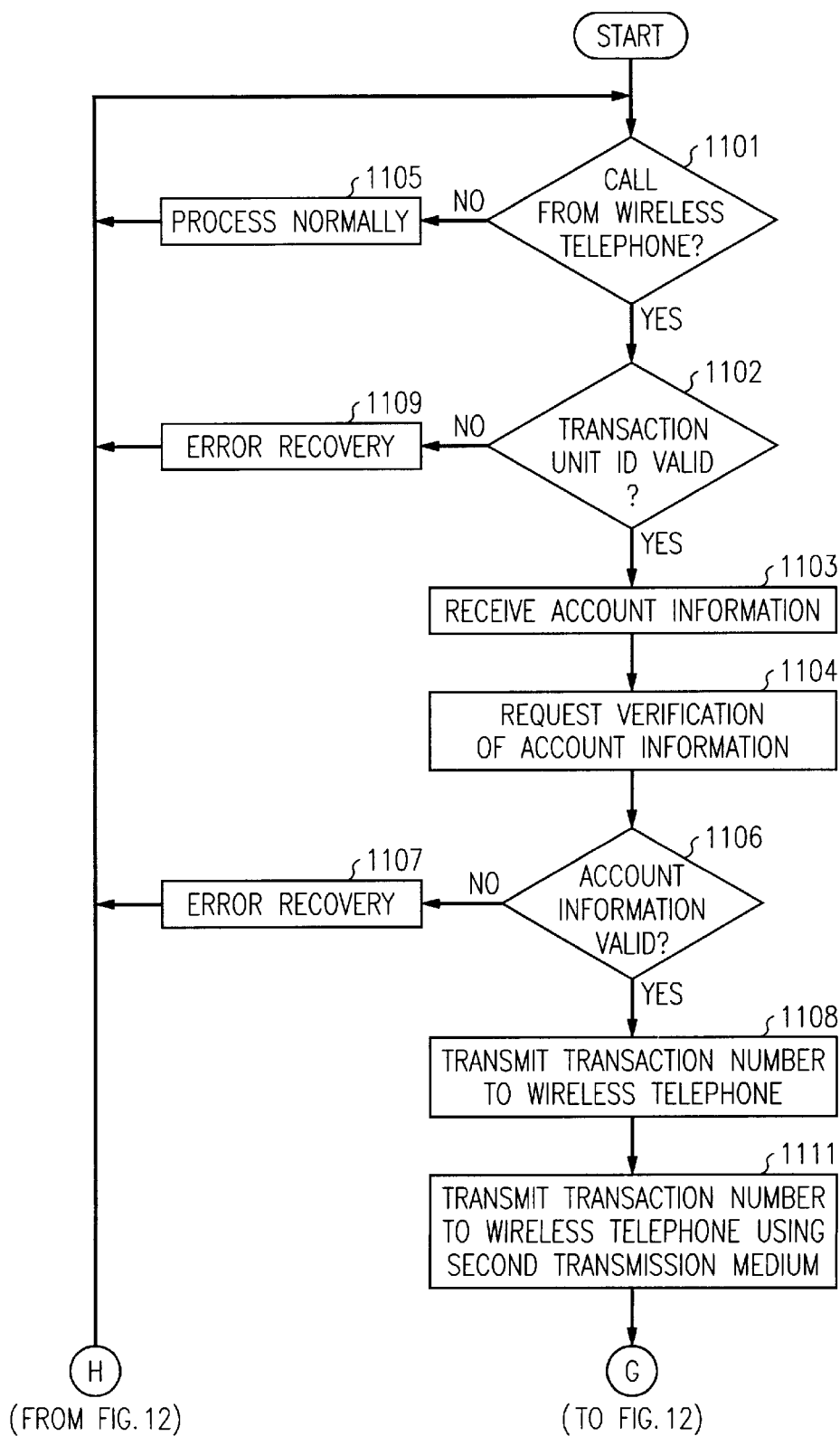
FIGS. 11 and 12 illustrate, in flowchart form, steps performed by a transaction unit in the second embodiment of the invention.
Figure 12:
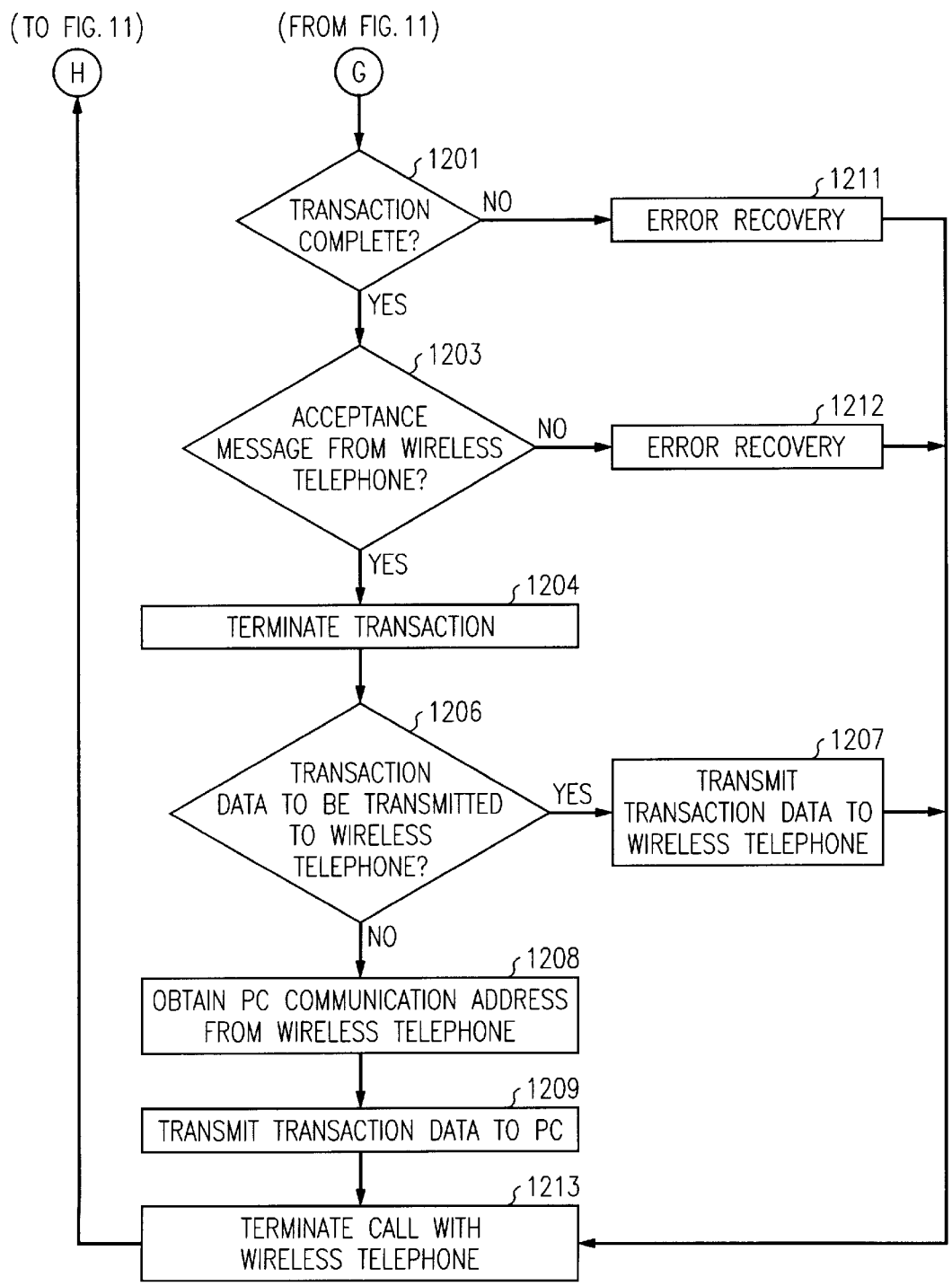

FIGS. 11 and 12 illustrate the steps performed by transaction unit 306 FIG. 3. Once operation has started, decision block 1101 determines if a call from a wireless telephone has been received. If the answer is no, block 1105 performs normal processing before returning control back to decision block 1101. If the answer is yes, decision block 1102 determines if transaction unit 306 is correctly identified in the message from the wireless telephone. If the answer is no in decision block 1102, block 1109 performs error recovery before transferring control back to decision block 1101. If the answer is yes in decision block 1102, block 1103 receives the account information transmitted by the wireless telephone. Block 1104 then verifies the account information. For a credit card number, block 1104 contacts the credit card database, not illustrated in FIG. 1, to obtain verification of the credit card number. Decision block 1106 then determines if the account information verified in block 1104 is valid. If the answer is no, block 1107 performs error recovery before transferring control back to decision block 1101. If the answer in decision block 1106 is yes, transaction unit 306 determines a transaction number and transmits that transaction number to the wireless telephone by execution of block 1108. Block 1111 transmits the transaction number to the wireless telephone using transmitter 307 before transferring control to decision block 1201 of FIG. 12.

Decision block 1201 determines when the transaction is complete. If the answer is no in decision block 1201, block 1211 performs error recovery before transferring control to block 1213. Block 1213 terminates the call with the wireless telephone before transferring control back to decision block 1101 of FIG. 11. If the answer is yes in decision block 1201, control is transferred to decision block 1203 which determines if an acceptance message has been received from the wireless telephone. If no acceptance message has been received, block 1212 performs error recovery before transferring control to block 1213. If an acceptance message has been received from the wireless telephone, block 1204 completes the transaction.

Then, block 1204 transfers control to decision block 1206. Decision block 1206 determines if the transaction data gathered during the transaction are to be transmitted to the wireless telephone or to a PC owned by the user of the wireless telephone. If the transaction data is to be transmitted directly to the wireless telephone, block 1207 performs this operation before transferring control to block 1213. If the answer in decision block 1206 is no, block 1208 obtains the communication address of the PC from the wireless telephone. This communication address may be a telephone number so that a data call may be set up via a modem connected to the PC. The transmission of the transaction data to the PC is performed by block 1209. After execution of block 1209, control is transferred to block 1213.

Of course, various changes and modifications to the illustrative embodiments described above will be apparent to those skilled in the art. Such changes and modifications can be made without departing from the spirit and the scope of the invention and without diminishing its attendant advantages. It is therefore intended that such changes and modifications be covered by the following claims.

What is claimed is:

1. A method for conducting transactions by a wireless telephone with a transaction unit, comprising the steps of:

establishing a telecommunication call to the transaction unit by the wireless telephone upon the wireless telephone preparing to engage in a transaction for purchase of goods with the transaction unit;

transmitting account identification information via the telecommunication call to the transaction unit by the wireless telephone before engaging in the transaction;

verifying the account identification information by the transaction unit with an account database system via a data path distinct from the telecommunication call before engaging in the transaction;

generating a transaction number defining a purchase cost of the goods by the transaction unit;

transmitting the transaction number to the wireless telephone by the transaction unit via the telecommunication call;

transmitting acceptance of the transaction to the transaction unit via the telecommunication call by the wireless telephone upon a user of the wireless telephone confirming that the transaction number received from the transaction unit is correct;

transmitting the transaction number to the account database system via the data path by the transaction unit upon receipt of the acceptance of the transaction; and charging an account defined by the account identification information for the cost of purchasing the goods by the account database system upon receipt of the transaction number from the transaction unit.

2. The method of claim 1 further comprises the step of verifying personal identification information of a user of the wireless telephone by the wireless telephone before the step of establishing is performed.

3. The method of claim 2 further comprises the step of transmitting transaction data to the wireless telephone in response to the acceptance message by transaction unit where the transaction data specifies information about the transaction.

4. The method of claim 3 wherein a remote personal computer is used by the user and the method further comprises the step of transmitting the transaction data to the personal computer by the wireless telephone.

5. The method of claim 3 wherein a remote personal computer is used by the user and the method further comprises the step of transmitting the transaction data to the personal computer by the transaction unit in response to the acceptance message.

6. The method of claim 2 further comprises the step of transmitting by the transaction unit the generated transaction number to the wireless telephone via a transmission medium other than the transmission medium used by the wireless telephone to make the telecommunication call.

7. The method of claim 6 further comprises the step of transmitting transaction data to the wireless telephone in response to the acceptance message by the transaction unit where the transaction data specifies information about the transaction.

8. The method of claim 7 wherein a remote personal computer is used by the user and the method further comprises the step of transmitting the transaction data to the personal computer by the wireless telephone.

9. The method of claim 6 further comprises the step of transmitting transaction data to the wireless telephone in response to the acceptance message by the transaction unit where the transaction data specifies information about the transaction.

10. An apparatus for performing the method of claim 2.

11. An apparatus for performing the method of claim 6.

* * * * *